US010685596B2

(12) United States Patent
Yen et al.

(10) Patent No.: US 10,685,596 B2
(45) Date of Patent: Jun. 16, 2020

(54) DISPLAY APPARATUS AND OPERATING METHOD THEREOF

(71) Applicant: InnoLux Corporation, Miao-Li County (TW)

(72) Inventors: Chung-Wen Yen, Miao-Li County (TW); Kuo-Cheng Tung, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 38 days.

(21) Appl. No.: 16/041,847

(22) Filed: Jul. 23, 2018

(65) Prior Publication Data

US 2019/0057640 A1 Feb. 21, 2019

(30) Foreign Application Priority Data

Aug. 17, 2017 (CN) .......................... 2017 1 0707900

(51) Int. Cl.
*G09G 3/22* (2006.01)
*H04N 7/08* (2006.01)
*G02F 1/13357* (2006.01)
*G09G 3/20* (2006.01)
*H04N 5/66* (2006.01)

(52) U.S. Cl.
CPC .......... *G09G 3/22* (2013.01); *G02F 1/133611* (2013.01); *G09G 3/2092* (2013.01); *H04N 5/66* (2013.01); *H04N 7/0806* (2013.01); *G09G 2310/0264* (2013.01); *G09G 2320/064* (2013.01); *G09G 2320/0626* (2013.01); *G09G 2320/0666* (2013.01); *G09G 2320/0686* (2013.01); *G09G 2330/021* (2013.01)

(58) Field of Classification Search
CPC ................... G09G 3/22; G09G 3/2092; G09G 2310/0264; G09G 2320/0626; G09G 2320/064; G09G 2320/0666; G09G 2320/0686; G02F 1/133611; H04N 5/66
See application file for complete search history.

(56) References Cited

U.S. PATENT DOCUMENTS 9,740,046 B2 8/2017 Wyatt
2008/0272701 A1* 11/2008 Park ..................... G09G 3/3413
315/151
2015/0130850 A1* 5/2015 Wyatt .................... G09G 3/342
345/690

(Continued)

FOREIGN PATENT DOCUMENTS

EP 2 706 400 A1 3/2014

*Primary Examiner* — Robert J Michaud
(74) *Attorney, Agent, or Firm* — Winston Hsu

(57) ABSTRACT

The present disclosure provides a display apparatus and an operating method thereof. The display apparatus includes a control unit and a display module. The control unit outputs a first signal. The display module is coupled to the control unit, and the display module continuously displays a first image in a first period based on the first signal, in which the first image has a first pattern, and a first ratio of an area of the first pattern to an area of the first image ranges from 5% to 30%. The first pattern has a first brightness at a first time point in the first period, and the first pattern has a second brightness at a second time point in the first period. The second time point is later than the first time point, and the second brightness is less than the first brightness.

20 Claims, 11 Drawing Sheets

(56) References Cited

U.S. PATENT DOCUMENTS

2015/0138060 A1* 5/2015 Takayanagi ........... G01J 1/4204
345/102
2017/0061595 A1* 3/2017 Suzuki ...................... G06T 5/40

* cited by examiner

DISPLAY APPARATUS AND OPERATING METHOD THEREOF

CROSS REFERENCE TO RELATED APPLICATION

The present application claims the benefit of China application serial no. 201710707900.3, filed Aug. 17, 2017, and the entire contents of which are incorporated herein by reference.

BACKGROUND OF THE DISCLOSURE

1. Field of the Disclosure

The present disclosure relates to a display apparatus and an operating method thereof, and more particularly, to a display apparatus with a high dynamic range (HDR) and an operating method thereof.

2. Description of the Prior Art

Display apparatus is a device for providing images, such that the images can be viewed by the user. Since that, performance of the images directly influences perception of the user. Recently, for improving image quality viewed by the user, color gamut of the display apparatus is usually raised to enrich colorfulness of image color in this art, so that wide color gamut display apparatuses have been developed, and image standards of wide color gamut have been provided. For example, past standard of BT. 709 advances to be a standard of DCI-P3, even a standard of BT. 2020. However, perception of human visual system to color relates to not only chromaticity shown in chromaticity diagram but also brightness, in which chromaticity and brightness may constitute chromaticity space. Accordingly, display apparatus with HDR is further produced in consideration of the chromaticity space. Nevertheless, the display apparatus with HDR still has some disadvantages, and to continuously improve the display apparatus with HDR is an objective in this field.

SUMMARY OF THE DISCLOSURE

An embodiment of the present disclosure provides a display apparatus including a control unit and a display module. The control unit outputs a first signal. The display module is coupled to the control unit, and the display module continuously displays a first image in a first period based on the first signal, in which the first image has a first pattern, and a first ratio of an area of the first pattern to an area of the first image ranges from 5% to 30%. The first pattern has a first brightness at a first time point in the first period, and the first pattern has a second brightness at a second time point in the first period. The second time point is later than the first time point, and the second brightness is less than the first brightness.

Another embodiment of the present disclosure provides an operating method of a display apparatus. First, a control unit and a display module are provided, in which the display module is coupled to the control unit. Then, a first signal is output to the display module through the control unit, such that the display module continuously displays a first image in a first period based on the first signal, wherein the first image has a first pattern, and a first ratio of an area of the first pattern to an area of the first image ranging from 5% to 30%. The first pattern has a first brightness at a first time point in the first period, and the first pattern has a second brightness at a second time point in the first period. The second time point is later than the first time point, and the second brightness is less than the first brightness.

These and other objectives of the present disclosure will no doubt become obvious to those of ordinary skill in the art after reading the following detailed description of the embodiment that is illustrated in the various figures and drawings.

DETAILED DESCRIPTION

The present disclosure may be understood by reference to the following detailed description, taken in conjunction with the drawings as described below so as to enable a person skilled in the pertinent art to make and use the present disclosure. Embodiments are not intended to limit the scope of the present disclosure, and the technical features in the embodiments described herein can be replaced or recombined. Also, it is understood that term "include" and/or "have" as used herein is referred to existence of features, regions, steps, operations and/or devices, and one or more features, regions, steps, operations and/or devices may be present or added. It should be understood that when a device, such as a layer or region, is referred to as being "on" another device (or its variant), it can be directly on another device, or intervening devices may also be present. It should be also understood that when a device is referred to as being "coupled to" another device (or its variant), it can be directly connected to another device or indirectly connected (such as electrically connected) to another device through one or more devices.

Figure 1:
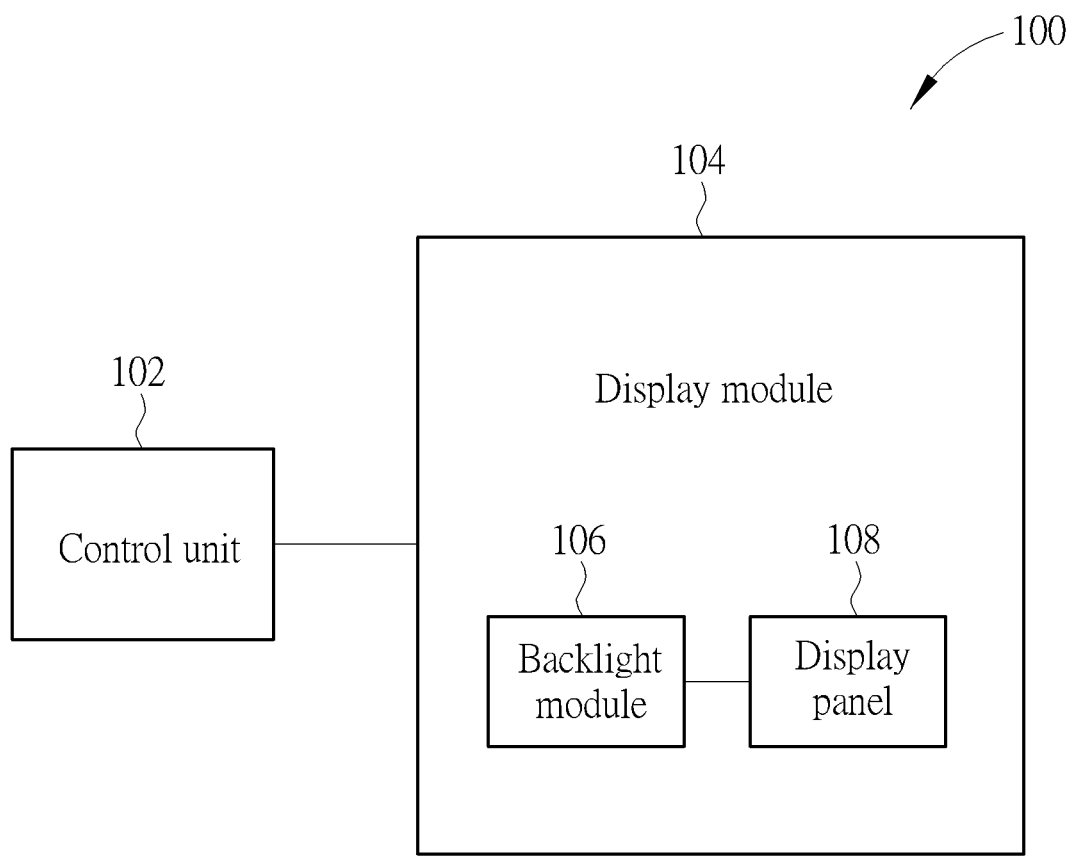
FIG. 1 is a schematic functional block diagram illustrating a display apparatus according to an embodiment of the present disclosure.
Figure 2:
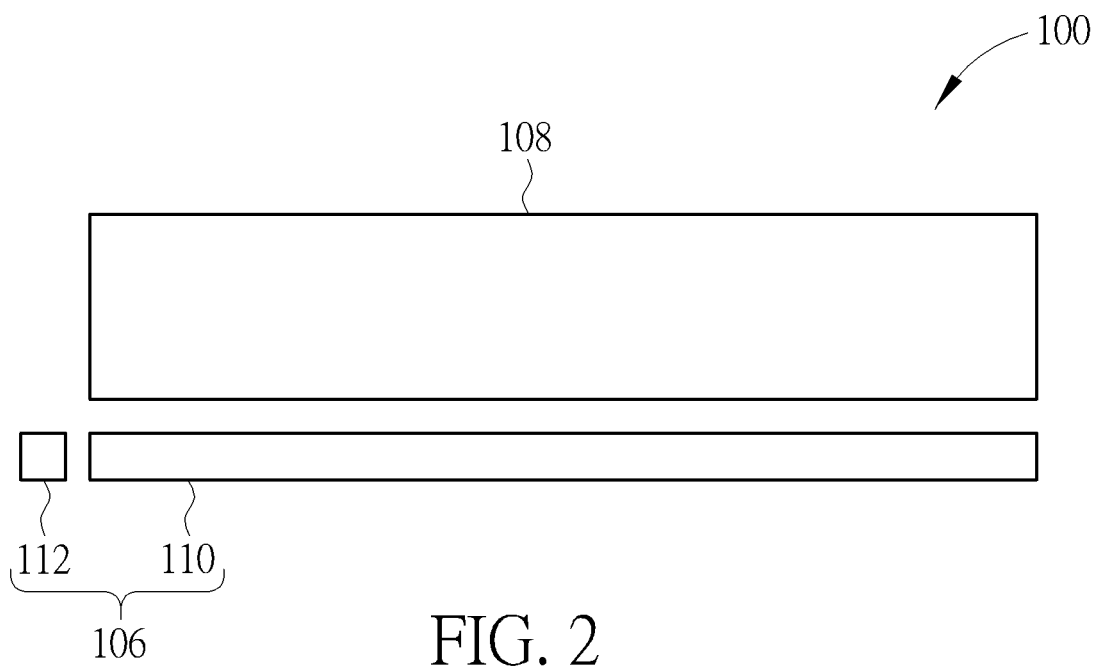
FIG. 2 is a schematic diagram illustrating a side view of the display apparatus according to a first embodiment of the present disclosure.

Referring to FIG. 1 and FIG. 2, FIG. 1 is a schematic functional block diagram illustrating a display apparatus according to an embodiment of the present disclosure, and FIG. 2 is a schematic diagram illustrating a side view of the display apparatus according to a first embodiment of the present disclosure, while the control unit is omitted. As shown in FIG. 1 and FIG. 2, the display apparatus 100 includes a control unit 102 and a display module 104. The display module 104 is coupled to the control unit 102, and the control unit 102 is configured to transmit a display signal to the display module 104. Since the display module 104 of this embodiment is a display module that has high dynamic range (HDR), the display module 104 may display an image with HDR after receiving the display signal. In this embodiment, the display module 104 may include a backlight module 106 and a display panel 108. The display panel 108 may be a non-self-luminous display panel, such as a liquid crystal display panel. The backlight module 106 may be disposed under the display panel 108 for providing a backlight, and the present disclosure is not limited thereto. In another embodiment, the display apparatus may be a self-luminous display apparatus, such as an organic light-emitting-diode display apparatus, so the display apparatus may not include the backlight module, and the backlight brightness described below may serve as a luminous brightness of the self-luminous display apparatus. In this embodiment, the backlight module 106 may include a light guide plate 110 and a light-emitting device 112. The light guide plate 110 is disposed right under the display panel 108, and the light-emitting device 112 is disposed at a side of the light guide plate 110, such that light generated from the light-emitting device 112 enters the light guide plate 110 from the side of the light guide plate 110. That is, the backlight module 106 of this embodiment is an edge type backlight module, but the present disclosure is not limited thereto.

Figure 3:
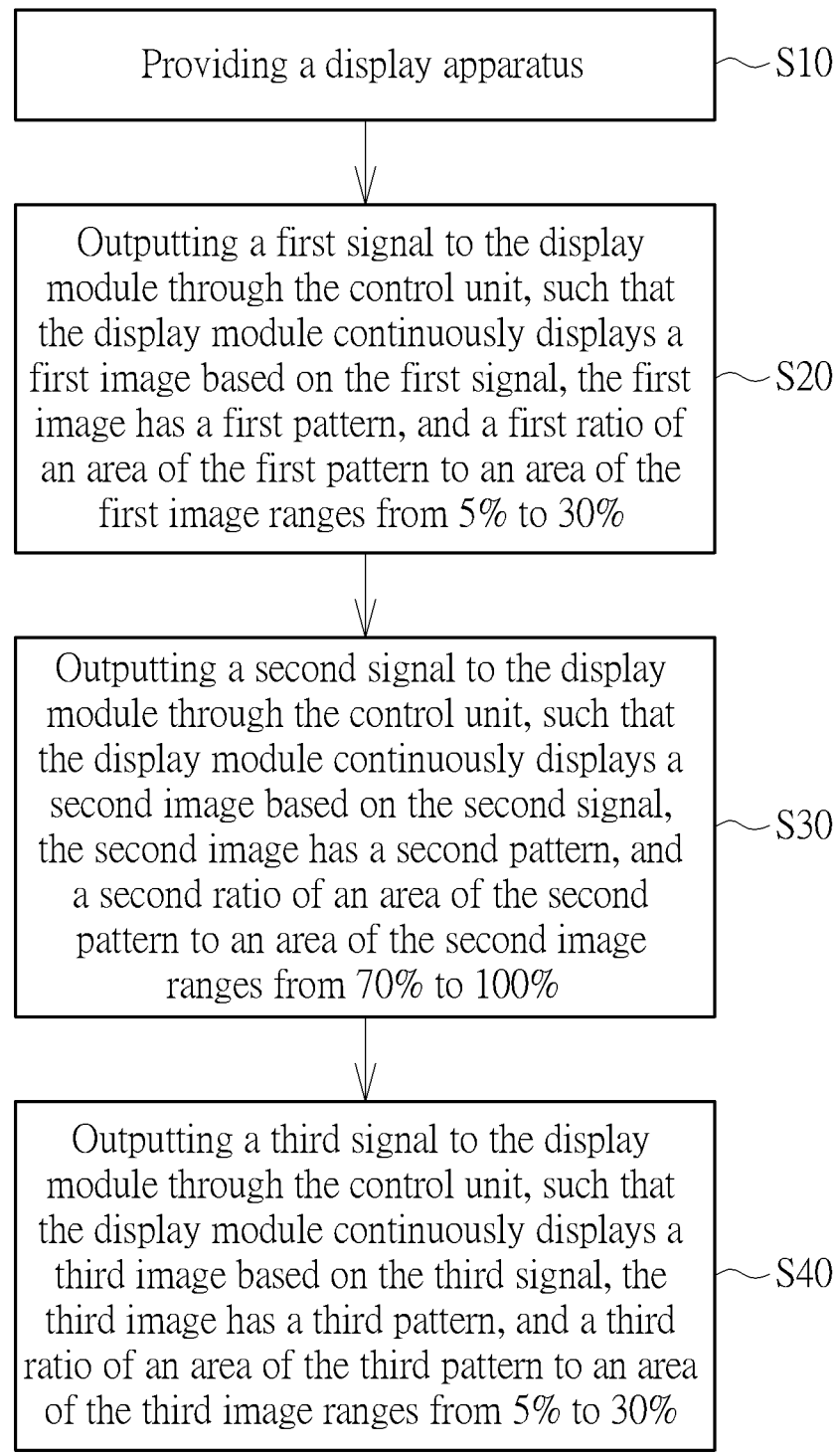
FIG. 3 is a flowchart illustrating an operating method of the display apparatus according to the first embodiment of the present disclosure.
Figure 4:
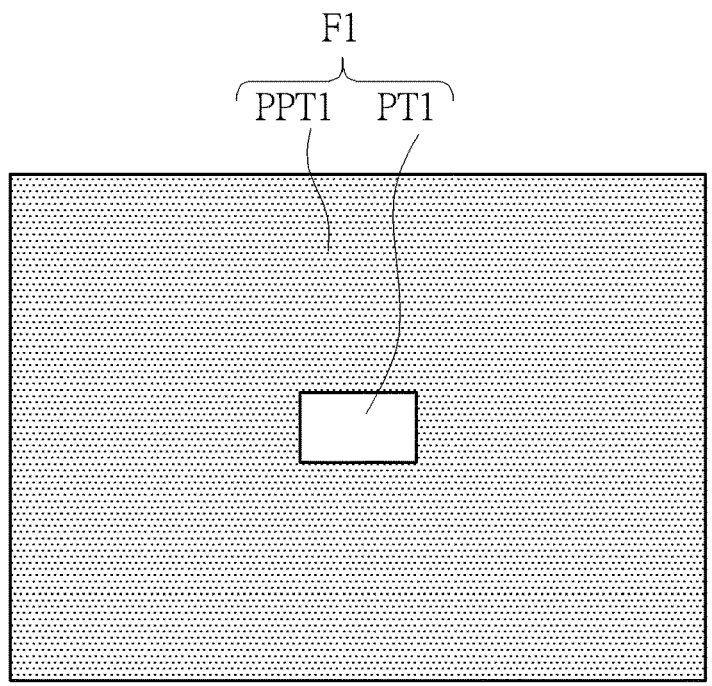
FIG. 4 is a schematic diagram illustrating a first image displayed by the display apparatus.

The following description further details an operating method of the display apparatus of this embodiment. Referring to FIG. 3 and FIG. 4, FIG. 3 is a flow chart illustrating the operating method of the display apparatus according to the first embodiment of the present disclosure, and FIG. 4 is a schematic diagram illustrating an image displayed by the display apparatus. As shown in FIG. 3, the operating method of the display apparatus 100 of this embodiment may include the following steps. First, a step S10 is performed to provide the above-mentioned display apparatus 100. Then, as shown in FIG. 4, a step S20 is performed to output a first signal to the display module 104 through the control unit 102, such that the display module 104 continuously displays a first image F1 in a first frame time FT1 based on the first signal. The first image F1 has a first pattern PT1, and a first ratio of an area of the first pattern PT1 to an area of the first image F1 ranges from 5% to 30%. Specifically, the first image F1 may further have a peripheral pattern PPT1 surrounding the first pattern PT1, and the peripheral pattern PPT1 and the first pattern PT1 constitute a whole of the first image F1. The first pattern PT1 may be for example a white pattern, and the peripheral pattern PPT1 may be for example a black pattern, but the present disclosure is not limited thereto. A brightness of the following pattern (such as the first pattern, the second pattern or the third pattern) is measured from a center point of the corresponding pattern for instance, but the present disclosure is not limited thereto.

Figure 5:
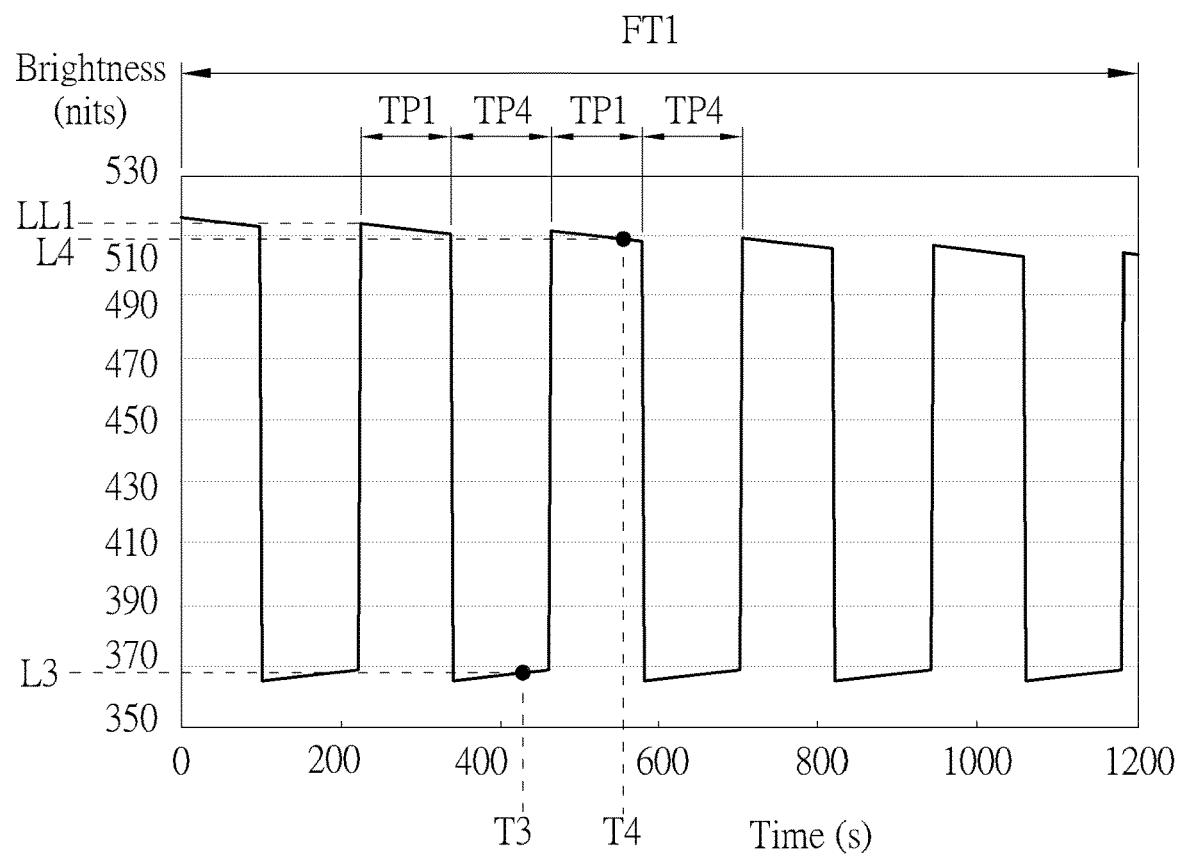
FIG. 5 is a schematic diagram illustrating a relation between brightness of the first pattern and time.
Figure 6:
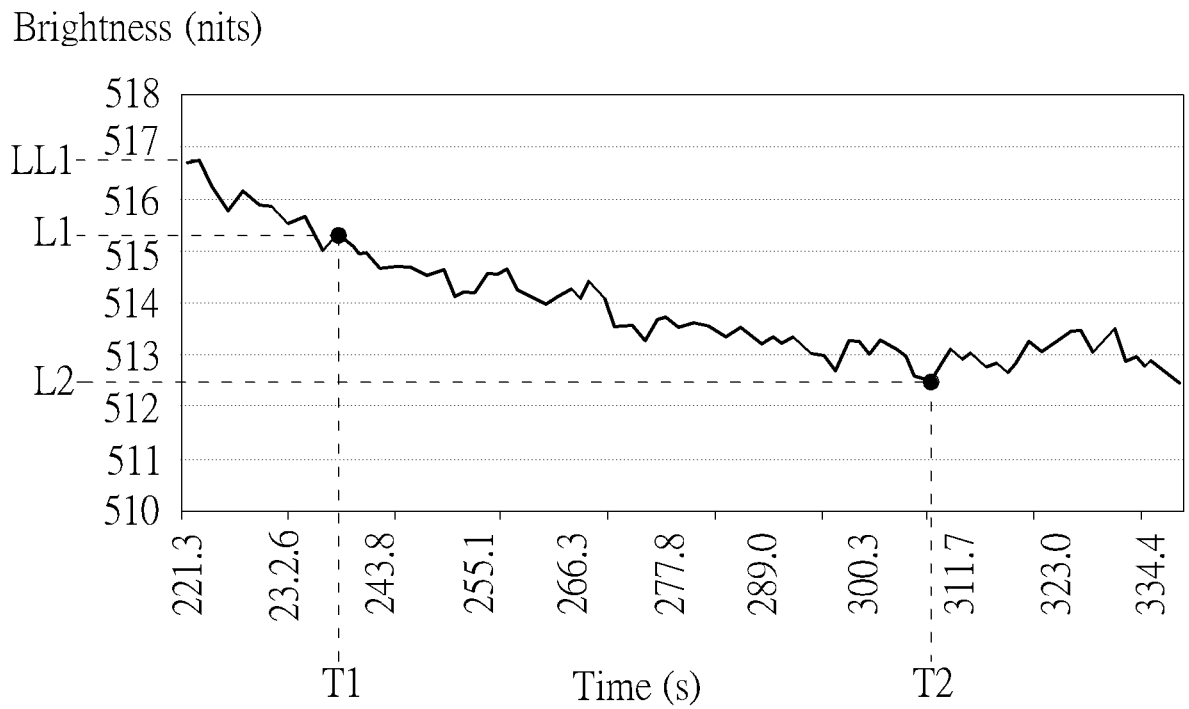
FIG. 6 is a schematic diagram illustrating an enlarged view of the first period shown in FIG. 5.

Referring to FIG. 5 and FIG. 6, FIG. 5 is a schematic diagram illustrating a relation between brightness of the first pattern and time, and FIG. 6 is a schematic diagram illustrating an enlarged view of the first period shown in FIG. 5, in which the first ratio of the first pattern used in FIG. 5 and FIG. 6 is for example 10%, but the present disclosure is not limited thereto. As shown in FIG. 5 and FIG. 6, the first frame time FT1 may at least include a first period TP1. The first pattern PT1 has a first brightness L1 at a first time point T1 in the first period TP1, and the first pattern PT1 has a second brightness L2 at a second time point T2 in the first period TP1, in which the second time point T2 is later than the first time point T1, and the second brightness L2 is less than the first brightness L1. Preferably, the second time point T2 is at least 10 seconds later than the first time point T1. Specifically, in the first period TP1, the display module 104 displays the first image F1 in the HDR mode, such that the brightness of the first pattern PT1 is increased by significantly increasing the backlight brightness generated from the backlight module 106, which raises a contrast ratio between the first pattern PT1 and the peripheral pattern PPT1, and improves image quality of the first image F1. In such situation, the first pattern PT1 has a first largest brightness LL1 substantially at a start point of the first period TP1. It is noted that when the backlight mode is operated in the HDR mode, the light-emitting device 112 is driven to generate a brightness close to its brightness limit, which means current for driving the light-emitting device 112 is increased to intensify the brightness from the light-emitting device 112. Through designing the second brightness L2 displayed at the second time point T2 later than the first time point T1 to be less than the first brightness L1 displayed at the first time point T1 in the first period TP1, which means the brightness of the first pattern PT1 is designed to be reduced as time progresses in the first period TP1, the light-emitting device 112 can be prevented from damage or deterioration due to being driven in the HDR mode for a long time, which is driven to generate the brightness close to the brightness limit for a long time. Accordingly, useful life of the light-emitting device 112 can be prolonged. It is also noted that when the first time point T1 is the start point of the first period TP1, the first brightness L1 is the first largest brightness LL1. In other words, since the second time point T2 is later than the first time point T1, the second brightness L2 is less than the first largest brightness LL1, but the present disclosure is not limited thereto.

In this embodiment, the first frame time FT1 may further include a fourth period TP4 and another first period TP1, in which the fourth period TP4 is later than the first period TP1, and the another first period TP1 is later than the fourth period TP4. The first pattern PT1 has a third brightness L3 at a third time point T3 in the fourth period TP4, and the third brightness L3 is less than the first brightness L1 and less than the second brightness L2. The first pattern PT1 has a fourth brightness L4 at a fourth time point T4 in the another first period TP1, and the fourth brightness L4 is greater than the third brightness L3. Specifically, in the fourth period TP4, the display module 104 displays the first image F1 in a normal mode, so the brightness of the first pattern PT1 in the fourth period TP4 is much less than the brightness of the first pattern PT1 in the first period TP1. In the another the first period TP1, the display module 104 displays the first image F1 in the HDR mode again, so variance of the brightness of the first pattern PT1 displayed in the another the first period TP1 is substantially identical to variance of the brightness of the first pattern TP1 displayed in the first period TP1. For example, the first frame time FT1 may include a plurality of first periods TP1 and a plurality of fourth periods TP4, and each first period TP1 and the fourth period TP4 progress alternately, such that the display module 104 may display the first image F1 in the HDR mode and in the normal mode alternately. Accordingly, continuously turning on the light-emitting device 112 in the HDR mode in the whole of the first frame time FT1 can be prevented, so that possibility of damage or deterioration to the light-emitting device 112 can be reduced under the condition of maintaining the image quality of the HDR mode. It is noted that the first pattern PT1 has a plurality of the first largest brightnesses LL1 respectively in the first periods TP1, and the first largest brightness LL1 corresponding to the former first period TP1 is greater than the first largest brightness LL1 corresponding to the later first period TP1, which means the first largest brightness LL1 may be reduced as time progresses. Possibility of damage or deterioration to the light-emitting device 112 can be accordingly reduced. In another embodiment, the first largest brightnesses of the first pattern PT1 respectively in the first periods TP1 may also be substantially identical to each other.

Figure 7:
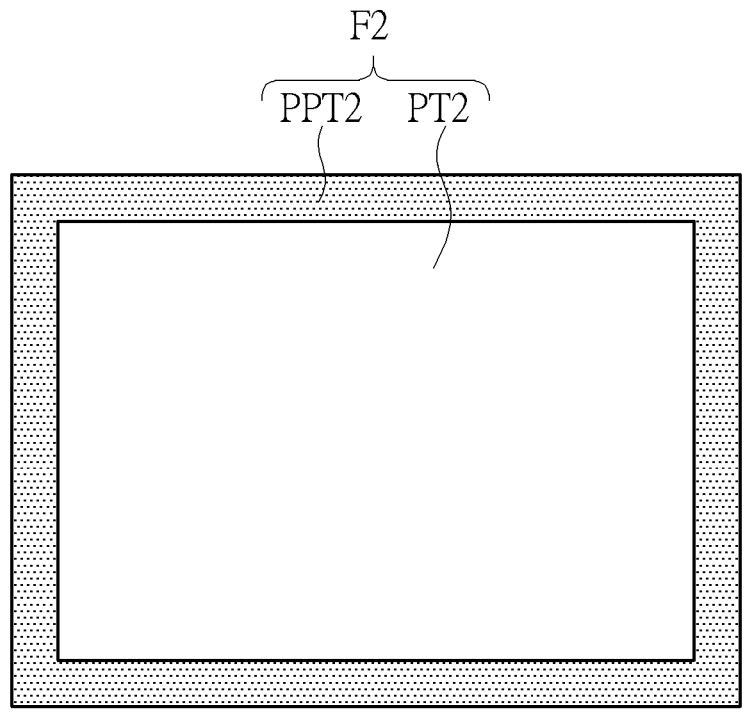
FIG. 7 is a schematic diagram illustrating a second image displayed by the display apparatus.
Figure 8:
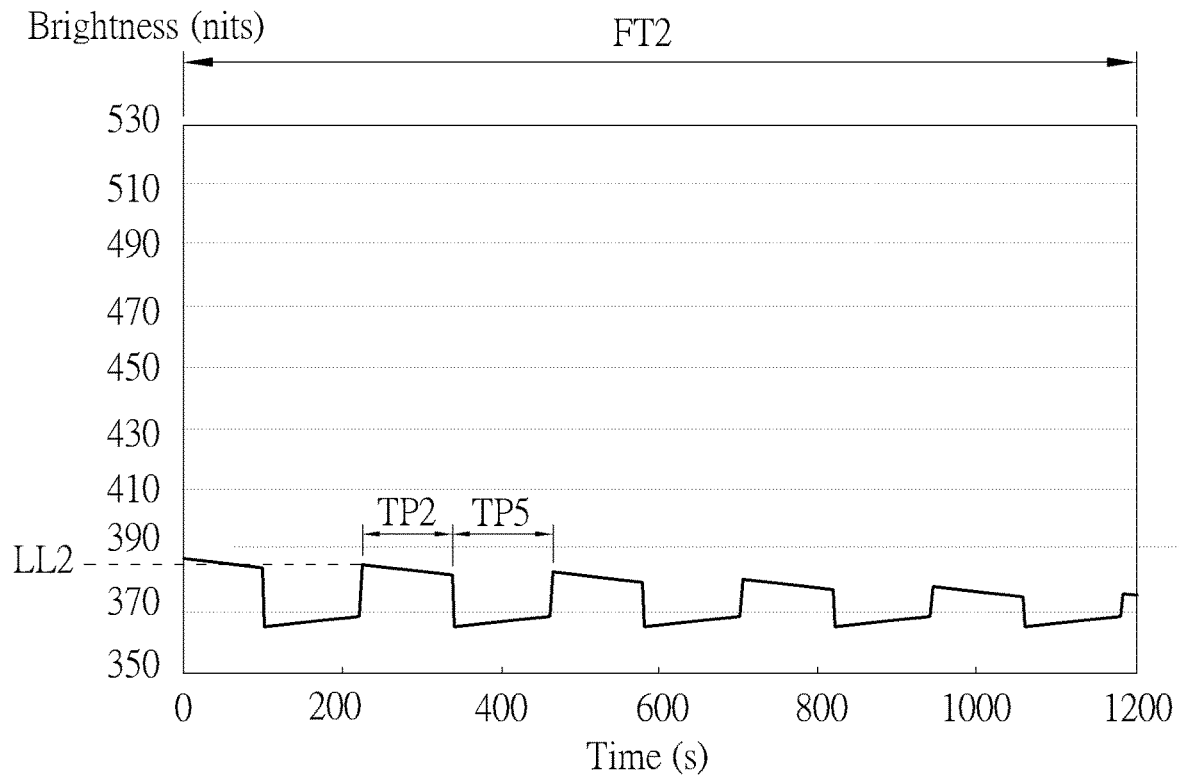
FIG. 8 is a schematic diagram illustrating a relation between brightness of the second pattern and time.

Refer to FIG. 7 and FIG. 8 together with FIG. 3. FIG. 7 is a schematic diagram illustrating a second image displayed by the display apparatus, and FIG. 8 is a schematic diagram illustrating a relation between brightness of a second pattern and time, in which a second ratio of the second pattern used in FIG. 8 is for example 70%, but the present disclosure is not limited thereto. As shown in FIG. 7 and FIG. 8, in step S30, a second signal may further be optionally output by the control unit 102, such that the display module 102 can continuously display a second image F2 in a second frame time FT2 based on the second signal. The second image F2 may have a second pattern PT2, and a second ratio of an area of the second pattern PT2 to an area of the second image F2 ranges from 70% to 100%. In this embodiment, the second pattern PT2 may be for example a white pattern. Specifically, the second image F2 may further have a peripheral pattern PPT2 surrounding the second pattern PT2, and the peripheral pattern PPT2 and the second pattern PT2 may constitute a whole of the second image F2. The peripheral pattern PPT2 may be for example a black pattern. In this embodiment, the first signal and the second signal are not overlapped with each other, which means the first frame time FT1 and the second frame time FT2 may not be connected to each other, and the step S30 for outputting the second signal may be later than the step S20 for outputting the first signal. In another embodiment, the step S30 for outputting the second signal may also be prior to the step S20 for outputting the first signal. In addition, the second frame time FT2 may include a second period TP2, and the display module 104 is operated in the HDR mode in the second period TP2. For example, the second frame time FT2 may also be similar to the first frame time FT1 and include a plurality of second periods TP2 corresponding to the HDR mode and a plurality of fifth periods TP5 corresponding to the normal mode, and each second period TP2 and each fifth period TP5 progress alternately. In this embodiment, the second pattern PT2 has a plurality of second largest brightnesses LL2 respectively in the second periods TP2, and the second largest brightness LL2 corresponding to the former second period TP2 is greater than the second largest brightness LL2 corresponding to the later second period TP2. In another embodiment, the second largest brightnesses of the second pattern PT2 respectively in the second periods TP2 may also be substantially identical to each other.

Figure 9:
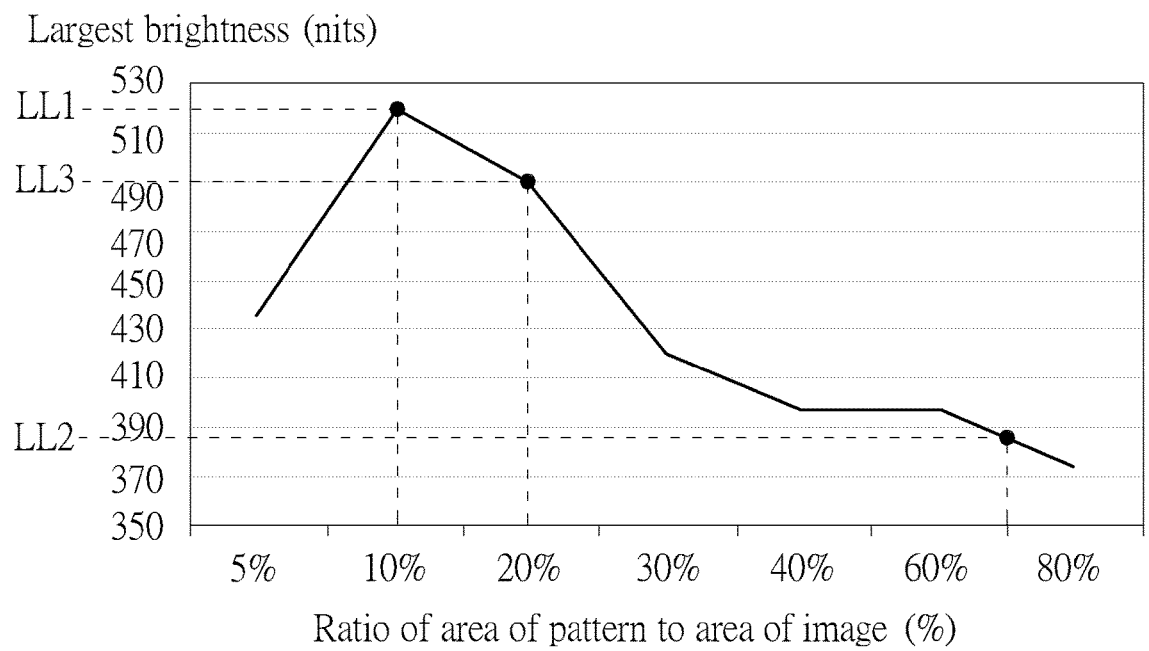
FIG. 9 is a schematic diagram illustrating a relation between the ratio of the area of the pattern to the area of the image and the largest brightness of the pattern displayed by the display module according to the first embodiment of the present disclosure.

Refer to FIG. 9 as well as FIG. 5 and FIG. 8. FIG. 9 is a schematic diagram illustrating a relation between a ratio of an area of a pattern to an area of an image and largest brightness of the pattern displayed by the display module according to the first embodiment of the present disclosure. As shown in FIG. 5, FIG. 8 and FIG. 9, the first largest brightness LL1 is greater than the second largest brightness LL2. That is, as the area of the pattern is increased, the largest brightness of the pattern is decreased. For example, when the first ratio is 10%, the first largest brightness LL1 of the first pattern PT1 may be substantially 517 nits, and when the second ratio is 70%, the second largest brightness LL2 of the second pattern PT2 may be substantially 385 nits. Through the variance of the largest brightness, the image of the first pattern PT1, such as sparkle of fireworks, can be highlighted when the first ratio of the area of the first pattern PT1 to the area of the image is lower, so as to provide the user a clear image, or the brightness of the second pattern PT2 can be reduced when the second ratio of the area of the second pattern PT2 to the area of the image becomes higher, so as to avoid over high image brightness, thereby providing the user a comfortable image. Moreover, it is noted that when the ratio of the pattern is close to 0%, such as ranges from 0% to 5%, signal to noise ratio of the pattern is increased, and since the largest brightness of the pattern with the ratio close to 0% is less than the largest brightness of the pattern with the ratio ranging from 5% to 30%, the noise is prevented from being enlarged.

Figure 10:
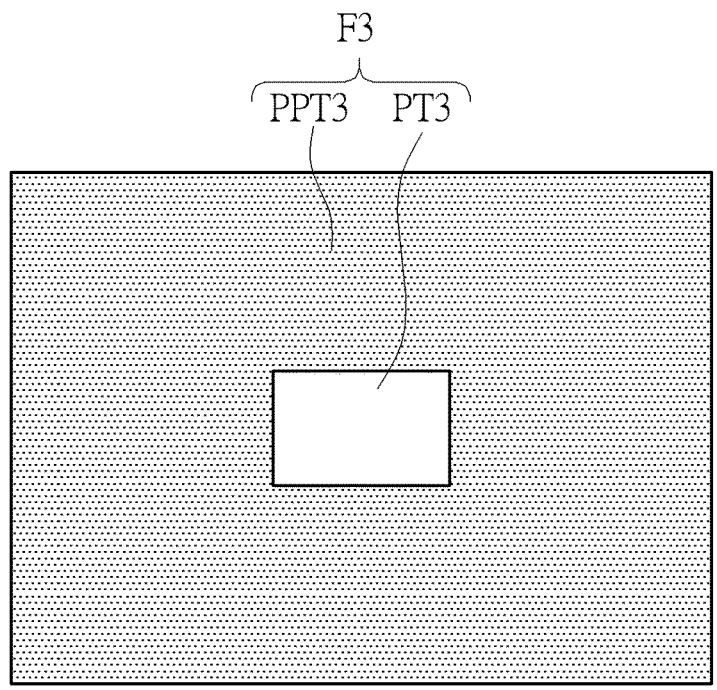
FIG. 10 is a schematic diagram illustrating a third image displayed by the display apparatus.
Figure 11:
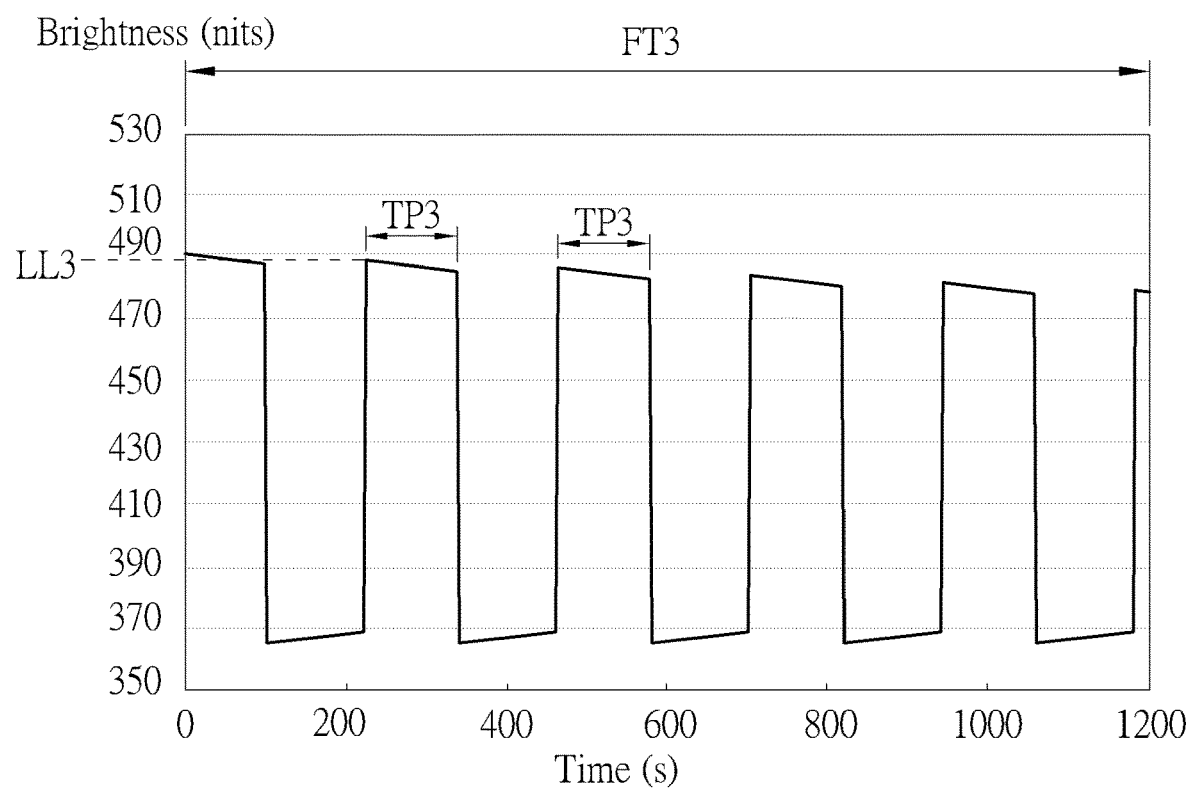
FIG. 11 is a schematic diagram illustrating a relation between brightness of the third pattern measured when the third ratio is greater than the first ratio and time.

Refer to FIG. 10 and FIG. 11 together with FIG. 3. FIG. 10 is a schematic diagram illustrating a third image displayed by the display apparatus, and FIG. 11 is a schematic diagram illustrating a relation between brightness of a third pattern measured when a third ratio is greater than the first ratio and time. As shown in FIG. 3, FIG. 10 and FIG. 11, after the step S30, a step S40 is performed to optionally output a third signal through the control unit 102, such that the display module 104 continuously displays a third image F3 in a third frame time FT3 based on the third signal, in which the display module 104 is operated in the HDR mode in third periods TP3. The third image F3 may have the third pattern PT3, and a third ratio of an area of the third pattern PT3 to an area of the third image F3 ranges from 5% to 30%, in which the third pattern PT3 has a third largest brightness LL3 in each third period TP3. In this embodiment, the third ratio is greater than the first ratio, which means the area of the third pattern PT3 is greater than the area of the first pattern PT1, and in such situation, the third largest brightness LL3 may be less than the first largest brightness LL1, such that a difference between a whole brightness of the first image F1 and a whole brightness of the third image F3 is not over large. For example, when the third ratio is 20%, the third largest brightness LL3 may be about 490 nits.

The display apparatus and the operating method thereof of the present disclosure are not limited by the above-mentioned embodiment. The following description continues to detail the other embodiments or variant embodiments, and in order to simplify and show the difference between the other embodiments or variant embodiments and the above-mentioned embodiment, the same numerals denote the same components in the following description, and the same parts are not detailed redundantly.

Figure 12A:
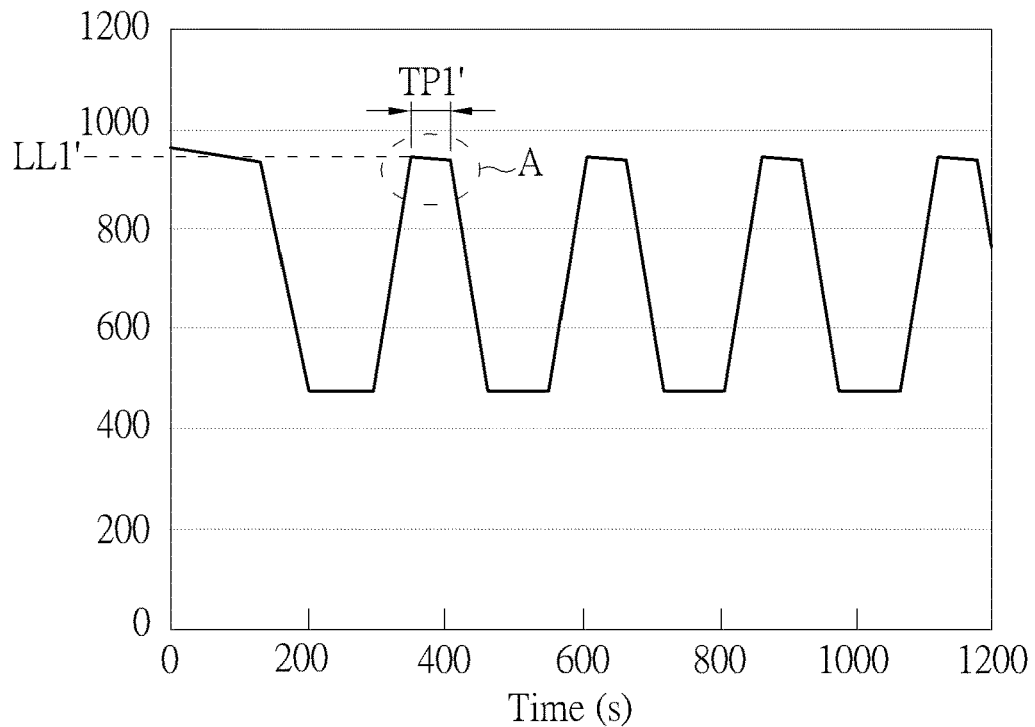
FIG. 12A is a schematic diagram illustrating a relation between brightness of the first pattern and time according to a variant embodiment.
Figure 12B:
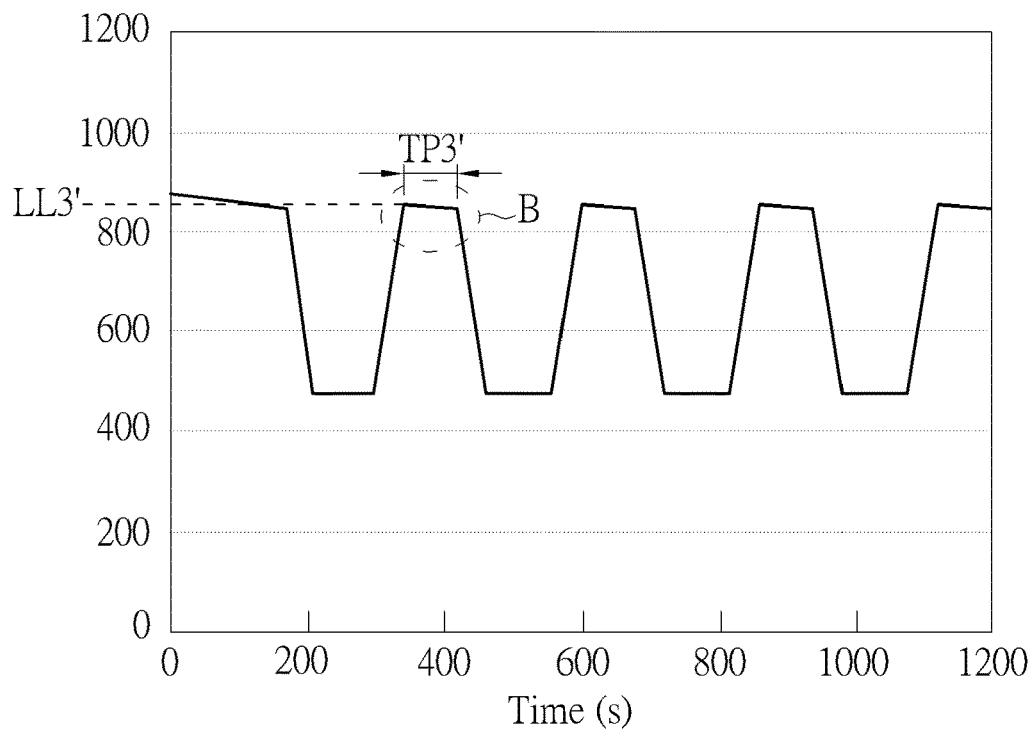
FIG. 12B is a schematic diagram illustrating a relation between brightness of the third pattern and time according to the variant embodiment of the present disclosure.

Referring to FIG. 12A and FIG. 12B, FIG. 12A is a schematic diagram illustrating a relation between brightness of the first pattern and time according to a variant embodiment, and FIG. 12B is a schematic diagram illustrating a relation between brightness of the third pattern and time according to the variant embodiment of the present disclosure, in which the first ratio of the first pattern used in FIG. 12A is for example 10%, and the third ratio of the third pattern used in FIG. 12B is for example 20%, but the present disclosure is not limited thereto. As shown in FIG. 12A and FIG. 12B, in this variant embodiment, when the third ratio of the third pattern PT3 is greater than the first ratio of the first pattern PT1, not only the first largest brightness LL1' of the first pattern PT1 in the first period TP1' (that is in the HDR mode) is greater than the third largest brightness LL3' of the third pattern PT3 in the third period TP3' (that is in the HDR mode), but also a length of the first period TP1 for performing the HDR mode (such as a period surrounded by a circle A shown in FIG. 12A) is shorter than a length of the third period TP3' for performing the HDR mode (such as a period surrounded by a circle B shown in FIG. 12B). In other words, when the ratio of the pattern is less, the largest brightness of the pattern in the HDR mode is increased, and for avoiding deterioration of the light-emitting device, the time of the pattern operated in the HDR mode is shorter, so as to prevent the light-emitting device from being driven to generate high brightness too long. Accordingly, the useful life of the light-emitting device can be prolonged.

Figure 13:
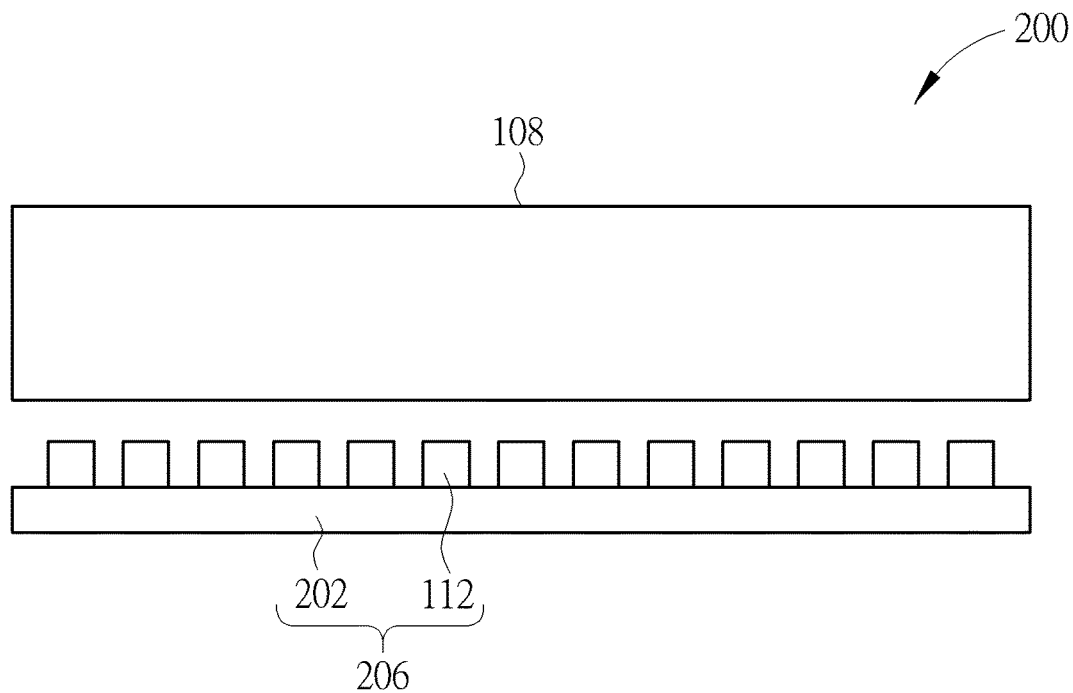
FIG. 13 is a schematic diagram illustrating a side view of a display apparatus according to a second embodiment of the present disclosure.
Figure 14:
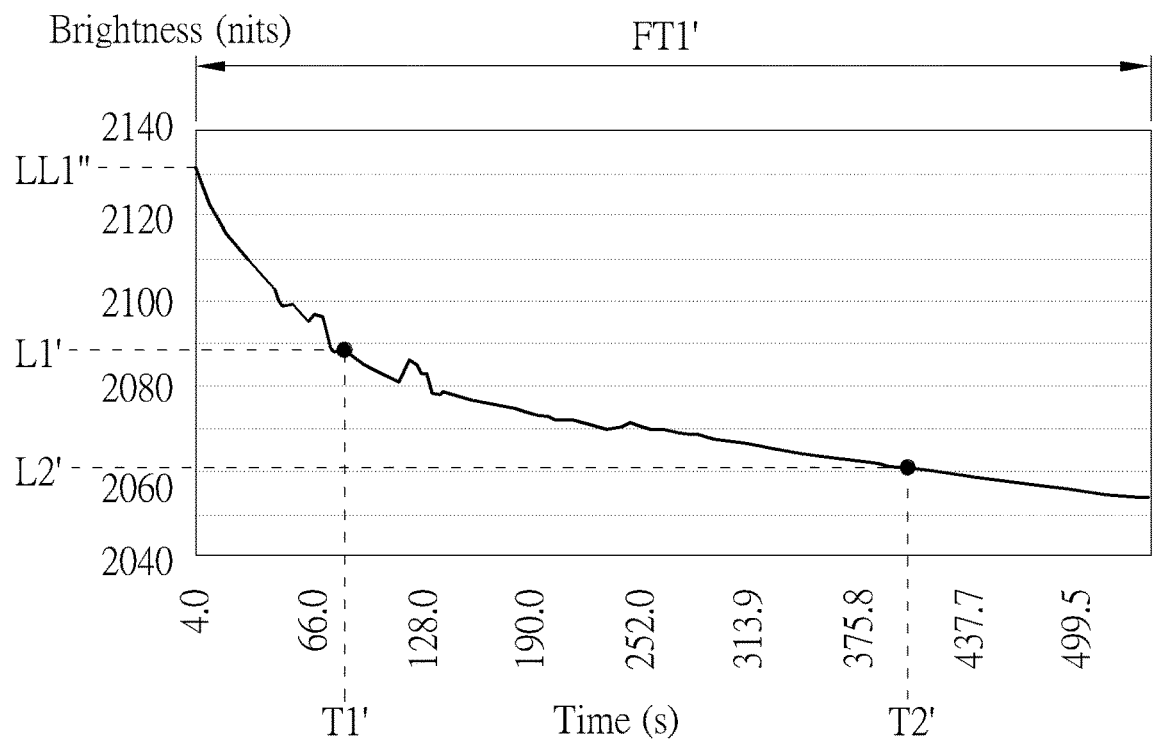
FIG. 14 is a schematic diagram illustrating a relation between brightness of the first pattern and time.
Figure 15:
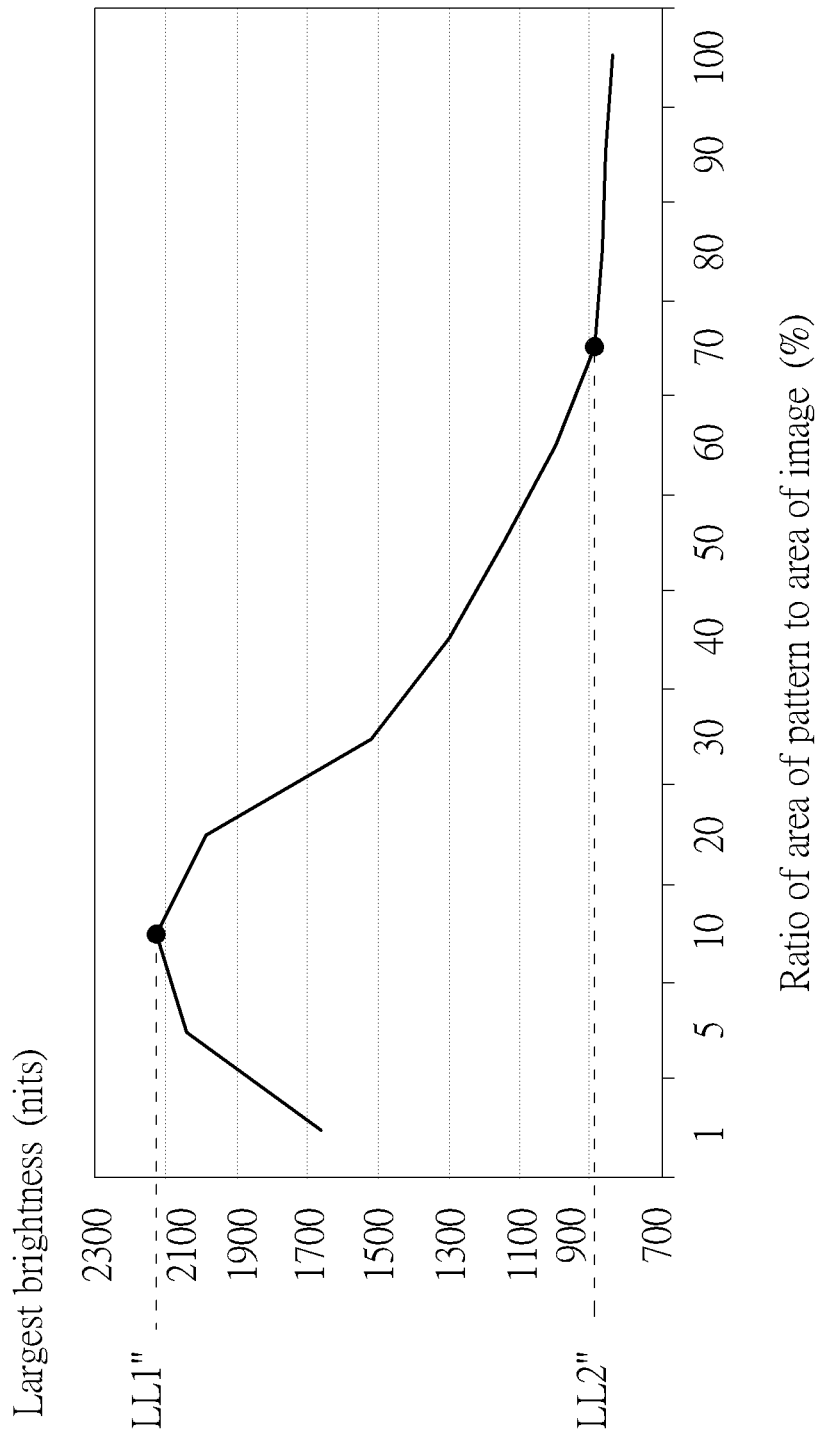
FIG. 15 is a schematic diagram illustrating a relation between a ratio of an area of a pattern to an area of image and largest brightness of the pattern displayed by the display module according to the second embodiment of the present disclosure.

Refer to FIG. 13 to FIG. 15 together with FIG. 4 and FIG. 7. FIG. 13 is a schematic diagram illustrating a side view of a display apparatus according to a second embodiment of the present disclosure, FIG. 14 is a schematic diagram illustrating a relation between brightness of the first pattern and time, and FIG. 15 is a schematic diagram illustrating a relation between a ratio of an area of a pattern to an area of an image and largest brightness of the pattern displayed by the display module according to the second embodiment of the present disclosure, in which the first ratio of the first pattern used in FIG. 14 is for example 10%, but the present disclosure is not limited thereto. As shown in FIG. 13, the backlight module 206 of this embodiment is a direct type backlight module, in which the light-emitting device of the backlight module 206 is disposed right under the display panel 108 and on the circuit board 202, but the present disclosure is not limited thereto. As shown in FIG. 14, as compared with the first embodiment, the first period of the display module 108 for performing the HDR mode is the same as the whole of the first frame time FT1' for displaying the first image in this embodiment. That is, since the backlight module 206 of this embodiment is a direct type, the light emitting devices 112 are distributed under the whole display panel 108, the number of the light-emitting device 112 of this embodiment is much greater than the number of the light-emitting device of the edge type backlight module. Thus, each light-emitting device 112 of the direct type backlight module 206 doesn't require generating brightness close to its brightness limit when being operated in the HDR mode, so that a load that each light-emitting device 112 tolerates is lower as compared with the above-mentioned embodiment. For this reason, the display module 108 of this embodiment can be operated in the HDR mode in the whole of the first frame time FT1'. In this embodiment, the first image displayed by the display module 104 is the same as the first image F1 of the above-mentioned first embodiment, and will not be detailed redundantly. As shown in FIG. 4 and FIG. 14, the first pattern PT1 may have the first largest brightness LL1" at a start point of the first frame time FT1'. The first brightness L1' of the first pattern PT1 at the first time point T1' in the first frame time FT1' may also be greater than the second brightness L2' of the first pattern PT1 at the second time point T2' later than the first point T1' in the first frame time FT1'. Accordingly, the brightness of the first pattern PT1 may also be reduced as time progresses, so that the deterioration to the light-emitting devices 112 may be suppressed, and the useful life of the light-emitting devices 112 can be prolonged. It is noted that when the first time point T1' is the start point of the first frame time FT1', the first brightness L1' is equal to the first largest brightness LL1". In other words, since the second time point T2' is later than the first time point T1', the second brightness L2' is less than the first largest brightness LL1", but the present disclosure is not limited thereto.

As shown in FIG. 4, FIG. 7 and FIG. 15, when the first ratio of the first pattern PT1 ranges from 5% to 30%, the first pattern PT1 has a first largest brightness LL1" in the first frame time FT1', and when the second ratio of the second pattern PT2 ranges from 70% to 100%, the second pattern PT2 has a second largest brightness LL2" in the second frame time, in which the first largest brightness LL1" is greater than the second largest brightness LL2". In other words, as the area of the pattern is increased, the largest brightness of the pattern is reduced. For example, when the first ratio is 10%, the first largest brightness LL1" may be about 2132 nits, and when the second ratio is 70%, the second largest brightness LL2" may be about 890 nits.

Figure 16:
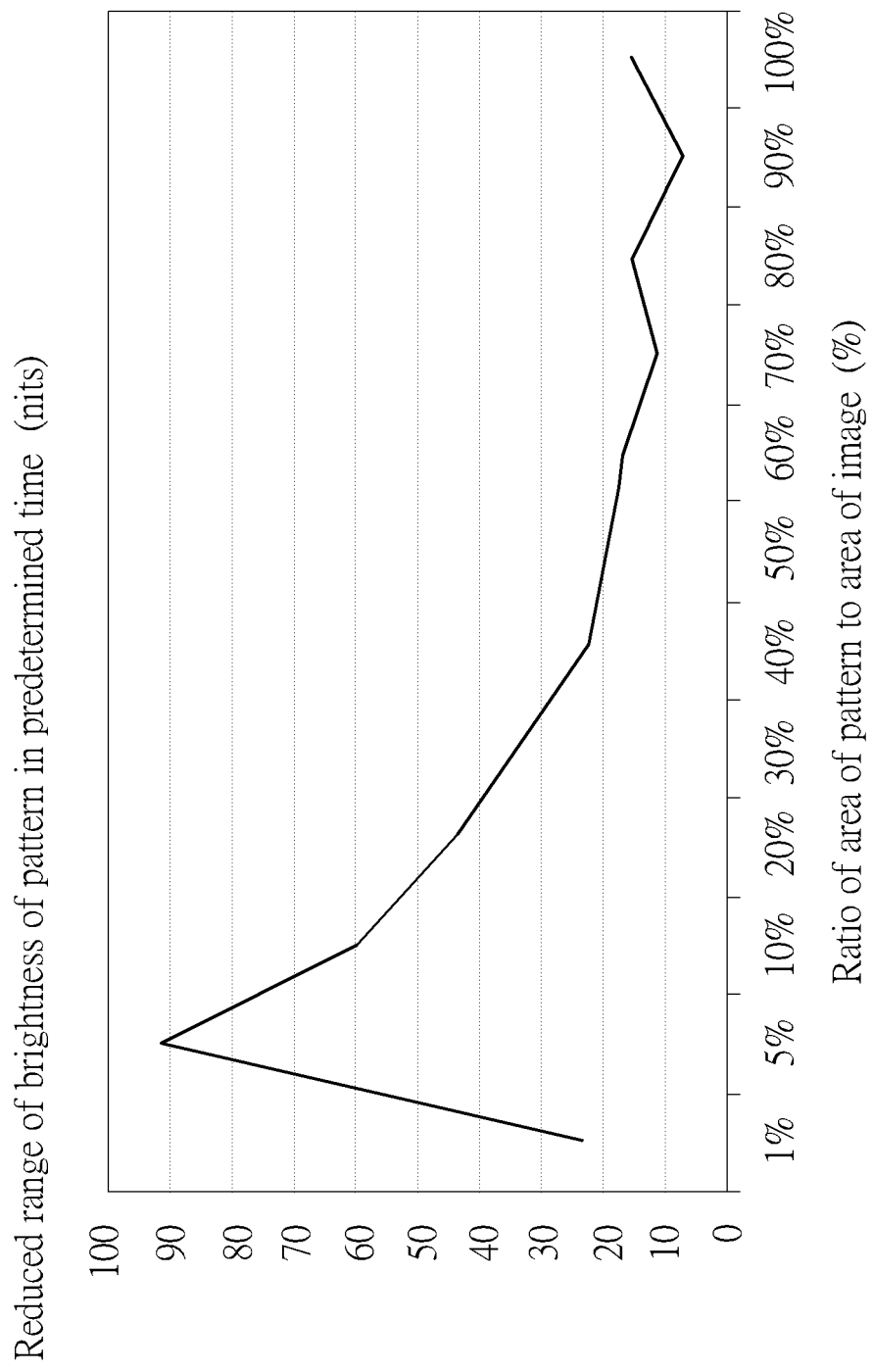
FIG. 16 is a schematic diagram illustrating a relation between a ratio of an area of a pattern to an area of an image and a reduced range of brightness of the pattern in a predetermined time according to the second embodiment of the present disclosure.

Referring to FIG. 4, FIG. 7 and FIG. 16, FIG. 16 is a schematic diagram illustrating a relation between a ratio of an area of a pattern to an area of an image and a reduced range of brightness of a pattern in a predetermined time according to the second embodiment of the present disclosure. As shown in FIG. 16, a reduced range of the brightness of the pattern with a ratio ranging from 5% to 30% in a predetermined time is greater than a reduced range of the brightness of the pattern with a ratio ranging from 70% to 100% in the same predetermined time. Specifically, a brightness of the first pattern PT1 with the first ratio from 5% to 30% is reduced from a first start brightness to a first reduced brightness in the predetermined time, a brightness of the second pattern PT2 with the second ratio from 70% to 100% is reduced from a second start brightness to a second reduced brightness in the same predetermined time, in which a difference between the first start brightness and the first reduced brightness (that is the reduced range) is greater than a difference between the second start brightness and the second reduced brightness. For example, the first start brightness may be the first largest brightness, and the second start brightness may be the second largest brightness, which means the predetermined time can be counted from a time point that starts to display the first pattern PT1 or the second pattern PT2, and the predetermined time may continue for 10 minutes. In another embodiment, the first start brightness may also be a brightness at a predetermined time point (such as 10 seconds later than starting to display the first pattern PT1) in the first frame time FT1', and the second start brightness may be a brightness at the predetermined time point (such as 10 seconds later than starting to display the second pattern PT2) in the second frame time. In other words, the predetermined time may be not counted until the first pattern PT1 and the second pattern PT2 is displayed for a period of time. For example, in FIG. 14, the first start brightness may be the first largest brightness LL1'', and when the predetermined time is defined as a period from the start point of the first frame time FT1' to the first time point T1', the first reduced brightness may be the first brightness L1', but the present disclosure is not limited thereto.

Figure 17:
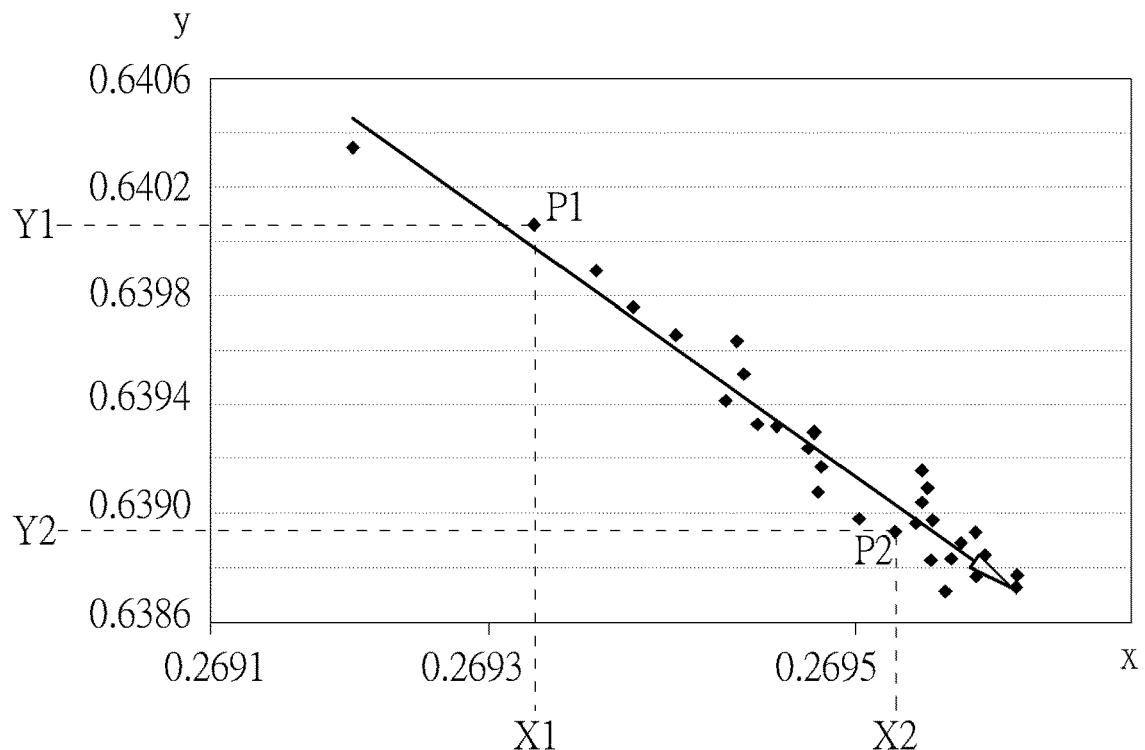
FIG. 17 is a CIE 1931 chromaticity diagram illustrating coordinate positions of the first pattern at different times according to a third embodiment of the present disclosure.
Figure 18:
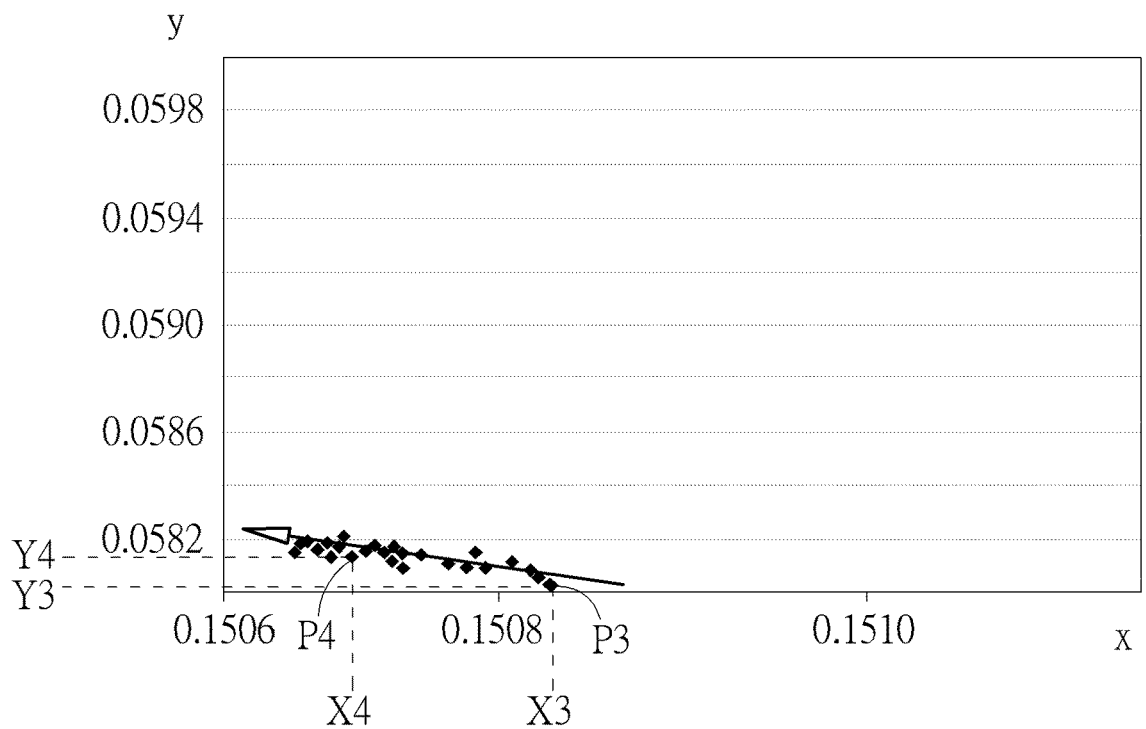
FIG. 18 is a CIE 1931 chromaticity diagram illustrating coordinate positions of the first pattern at different times according to a fourth embodiment of the present disclosure.

Refer to FIG. 17 and FIG. 18 as well as FIG. 6. FIG. 17 is a CIE 1931 chromaticity diagram illustrating coordinate positions of the first pattern at different times according to a third embodiment of the present disclosure, and FIG. 18 is a CIE 1931 chromaticity diagram illustrating coordinate positions of the first pattern at different times according to a fourth embodiment of the present disclosure, in which the backlight modules corresponding to FIG. 17 and FIG. 18 are for example direct type, and the first ratios corresponding to FIG. 17 and FIG. 18 are for example 10%, but the present disclosure is not limited thereto. As shown in FIG. 6 and FIG. 17, under the condition of maintaining the same ratio, the chromaticity of the first pattern is shifted in the first period (that is in the HDR mode). Specifically, when the first pattern is the green pattern, a color of the green pattern at the first time point T1 is located at a first coordinate position P1 in the CIE 1931 chromaticity diagram, and a color of the green pattern at the second time point T2 is located at a second coordinate position P2 in the CIE 1931 chromaticity diagram, in which the first coordinate position P1 is different from the second coordinate position P2. The first coordinate position P1 has a first x coordinate value X1 and a first y coordinate value Y1, and the second coordinate position P2 has a second x coordinate value and a second y coordinate value Y2, in which the second x coordinate value X2 is greater than the first x coordinate value X1, and the second y coordinate value Y2 is less than the first y coordinate value Y1. That is, when the first pattern is the green pattern, as time progresses, the x coordinate value of the color of the green pattern is gradually increased, and the y coordinate value of the color of the green pattern is gradually reduced, in which the variance of the x coordinate value and the variance of the y coordinate value of the color of the green pattern are shown as an arrow direction in FIG. 17. Additionally, a first difference exists between the first y coordinate value Y1 and the second y coordinate value Y2, a second difference exists between the second x coordinate value X2 and the first x coordinate value X1, and a ratio of the first difference to the second difference is defined as a first proportion that represents a varying range of the color of the green pattern as time progresses. In another embodiment, the first coordinate position corresponding to the first ratio of 30% is different from the first coordinate position P1 corresponding to the first ratio of 10%, and the second coordinate position corresponding to the first ratio of 30% is different from the second coordinate position P2 corresponding to the first ratio of 10%. It should be noted that the position of a color of the pattern in the CIE 1931 chromaticity diagram can be adjusted through controlling the current of driving the light emitting device, but the present disclosure is not limited thereto.

As shown in FIG. 6 and FIG. 18, as compared with the third embodiment, the first pattern of this embodiment may be a blue pattern. At the first time point T1, the color of the blue pattern is located at a third coordinate position P3 in the CIE 1931 chromaticity diagram, and at the second time point T2, the color of the blue pattern is located at a fourth coordinate position P4 in the CIE 1931 chromaticity diagram, in which the third coordinate position P3 is different from the fourth coordinate position P4. The third coordinate position P3 has a third x coordinate value X3 and a third y coordinate value Y3, and the fourth coordinate position P4 has a fourth x coordinate value X4 and a fourth y coordinate value Y4. In this embodiment, the fourth x coordinate value X4 is less than the third x coordinate value X3, and the fourth y coordinate value Y4 is greater than the third y coordinate value Y3, which means when the first pattern is the blue pattern, as time progresses, the x coordinate value of the color of the blue pattern is gradually reduced, and the y coordinate value of the color of the blue pattern is gradually increased, in which the variance of the x coordinate value and the variance of the y coordinate value of the color of the blue pattern are shown as the arrow direction in FIG. 18. Moreover, a third difference exists between the fourth y coordinate value Y4 and the third y coordinate value Y3, a fourth difference exists between the third x coordinate value X3 and the fourth x coordinate value X4, and a ratio of the third difference to the fourth difference is defined as a second proportion that represents a varying range of the blue pattern as time progresses. In another embodiment, the third coordinate position corresponding to the first ratio of 30% is different from the third coordinate position P3, and the third coordinate position corresponding to the first ratio of 30% is different from the second coordinate position P2 corresponding to the first ratio of 10%.

Refer to FIG. 17 as well as FIG. 18. It is noted that shifted direction of the chromaticity of the green pattern as time progresses and shifted direction of the chromaticity of the blue pattern as time progresses are substantially opposite to each other, so that the shift of the coordinate position of white color formed by the green pattern and the blue pattern as time progresses can be reduced. Also, the first proportion may be greater than the second proportion, which means the varying range of the green pattern as time progresses is greater than the varying range of the blue pattern as time progresses.

As aforementioned description, in the operating method of the display apparatus in the present disclosure, the brightness of the pattern in the HDR mode can be reduced as time progresses, so that the light-emitting device can be prevented from damage or deterioration due to being driven in the HDR mode for a long time. Accordingly, useful life of the light-emitting device can be prolonged. On the other hand, through gradually reducing the largest brightness of the pattern when the ratio of the area of the pattern to the area of the image is increased, a clear image or a comfortable image can be provided to the user.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display apparatus, comprising:
   a control unit outputting a first signal; and
   a display module coupled to the control unit, the display module continuously displaying a first image in a first period and a fourth period later than the first period based on the first signal, the first image having a first pattern, a first ratio of an area of the first pattern to an area of the first image ranging from 5% to 30%,
wherein the first pattern has a first brightness at a first time point in the first period,
the first pattern has a third brightness at a third time point in the fourth period, and the third brightness is less than the first brightness by a brightness difference greater than 120 nits.

2. The display apparatus according to claim 1, wherein the control unit further outputs a second signal, the display module continuously displays a second image in a second period based on the second signal, the second image has a second pattern, and a second ratio of an area of the second pattern to an area of the second image ranges from 70% to 100%, and wherein the first pattern has a first largest brightness in the first period, the second pattern has a second largest brightness in the second period, and the first largest brightness is greater than the second largest brightness.

3. The display apparatus according to claim 2, wherein a brightness of the first pattern is reduced from the first largest brightness to a first reduced brightness in a predetermined time, a brightness of the second pattern is reduced from the second largest brightness to a second reduced brightness in the predetermined time, and wherein a difference between the first largest brightness and the first reduced brightness is greater than a difference between the second largest brightness and the second reduced brightness.

4. The display apparatus according to claim 1, wherein the control unit further outputs a third signal, the display module continuously displays a third image in a third period based on the third signal, the third image has a third pattern, and a third ratio of an area of the third pattern to an area of the third image ranges from 5% to 30%, and wherein the third ratio is greater than the first ratio, the first pattern has a first largest brightness in the first period, the third pattern has a third largest brightness in the third period, and the third largest brightness is less than the first largest brightness.

5. The display apparatus according to claim 4, wherein a length of the first period is less than a length of the third period.

6. The display apparatus according to claim 1, wherein the first pattern has a second brightness at a second time point in the first period, wherein the second time point is later than the first time point, and the second brightness is less than the first brightness.

7. The display apparatus according to claim 1, wherein the display module continuously displays the first image in another first period later than the fourth period based on the first signal, the first pattern has a fourth brightness at a fourth time point in the another first period, the fourth brightness is greater than the third brightness by a brightness difference greater than 110 nits, and the fourth period is greater than 50 seconds.

8. The display apparatus according to claim 1, wherein the first image has a peripheral pattern surrounding the first pattern, the peripheral pattern and the first pattern constitute the first image, and the peripheral pattern is a black pattern.

9. The display apparatus according to claim 1, wherein the first pattern is a green pattern, the green pattern at the first time point has a color located at a first x coordinate value and a first y coordinate value in a CIE 1931 chromaticity diagram, the green pattern at the second time point has another color located at a second x coordinate value and a second y coordinate value in the CIE 1931 chromaticity diagram, and wherein the second x coordinate value is greater than the first x coordinate value, and the second y coordinate value is less than the first y coordinate value.

10. The display apparatus according to claim 1, wherein the first pattern is a blue pattern, the blue pattern at the first time point has a color located at a third x coordinate value and a third y coordinate value in a CIE 1931 chromaticity diagram, the blue pattern at the second time point has another color located at a fourth x coordinate value and a fourth y coordinate value in the CIE 1931 chromaticity diagram, and wherein the fourth x coordinate value is less than the third x coordinate value, and the fourth y coordinate value is greater than the third y coordinate value.

11. An operating method of a display apparatus, comprising:
providing a control unit and a display module, wherein the display module is coupled to the control unit; and
outputting a first signal to the display module through the control unit, such that the display module continuously displays a first image in a first period and a fourth period later than the first period based on the first signal, wherein the first image has a first pattern, and a first ratio of an area of the first pattern to an area of the first image ranges from 5% to 30%,
wherein the first pattern has a first brightness at a first time point in the first period
the first pattern has a third brightness at a third time point in the fourth period, and the third brightness is less than the first brightness by a brightness difference greater than 120 nits.

12. The operating method according to claim 11, further comprising:
outputting a second signal through the control unit, such that the display module continuously displays a second image in a second period based on the second signal, wherein the second image has a second pattern, a second ratio of an area of the second pattern to an area of the second image ranges from 70% to 100%, the first pattern has a first largest brightness in the first period, the second pattern has a second largest brightness in the second period, and the first largest brightness is greater than the second largest brightness.

13. The operating method according to claim 12, wherein a brightness of the first pattern is reduced from the first largest brightness to a first reduced brightness in a predetermined time, a brightness of the second pattern is reduced from the second largest brightness to a second reduced brightness in the predetermined time, and wherein a difference between the first largest brightness and the first reduced brightness is greater than a difference between the second largest brightness and the second reduced brightness.

14. The operating method according to claim 11, further comprising:
outputting a third signal through the control unit, such that the display module continuously displays a third image in a third period based on the third signal, wherein the third image has a third pattern, a third ratio of an area of the third pattern to an area of the third image ranges from 5% to 30%, the third ratio is greater than the first ratio, the first pattern has a first largest brightness in the first period, the third pattern has a third largest brightness in the third period, and the third largest brightness is less than the first largest brightness.

15. The operating method according to claim 14, wherein a length of the first period is less than a length of the third period.

16. The operating method according to claim 11, wherein the first pattern has a second brightness at a second time point in the first period, wherein the second time point is later than the first time point, and the second brightness is less than the first brightness.

17. The operating method according to claim 11, further comprising continuously displaying the first image in another first period later than the fourth period through the display module based on the first signal, wherein the first pattern has a fourth brightness at a fourth time point in the another first period, the fourth brightness is greater than the third brightness by a brightness difference greater than 110 nits, and the fourth period is greater than 50 seconds.

18. The operating method according to claim 11, wherein the first image has a peripheral pattern surrounding the first pattern, the peripheral pattern and the first pattern constitute the first image, and the peripheral pattern is a black pattern.

19. The operating method according to claim 11, wherein the first pattern is a green pattern, the green pattern at the first time point has a color located at a first x coordinate value and a first y coordinate value in a CIE 1931 chromaticity diagram, the green pattern at the second time point has another color located at a second x coordinate value and a second y coordinate value in the CIE 1931 chromaticity diagram, and wherein the second x coordinate value is greater than the first x coordinate value, and the second y coordinate value is less than the first y coordinate value.

20. The operating method according to claim 11, wherein the first pattern is a blue pattern, the blue pattern at the first time point has a color located at a third x coordinate value and a third y coordinate value in a CIE 1931 chromaticity diagram, the blue pattern at the second time point has another color located at a fourth x coordinate value and a fourth y coordinate value in the CIE 1931 chromaticity diagram, and wherein the fourth x coordinate value is less than the third x coordinate value, and the fourth y coordinate value is greater than the third y coordinate value.

* * * * *